United States Patent [19]

Imoto

[11] Patent Number: 4,856,859

[45] Date of Patent: Aug. 15, 1989

[54] OPTICAL WAVEGUIDE AND METHOD FOR FABRICATING THE SAME

[75] Inventor: Katsuyuki Imoto, Sayama, Japan

[73] Assignee: Hitachi, Ltd., Tokyo, Japan

[21] Appl. No.: 156,593

[22] Filed: Feb. 17, 1988

[30] Foreign Application Priority Data

Mar. 13, 1987 [JP] Japan .................................. 62-56526

[51] Int. Cl.$^4$ .................................................. G12B 6/10
[52] U.S. Cl. ................................. 350/96.12; 65/3.11;
219/121.61
[58] Field of Search ............... 350/96.11, 96.12, 96.13, 350/96.14, 96.15; 219/121 LJ, 121 LG, 121 LA, 121 LH, 121 LN, 121 LY; 65/3.11, 2, 4.1

[56] References Cited

U.S. PATENT DOCUMENTS

| | | | |
|---|---|---|---|
| 4,022,602 | 5/1977 | Pavlopoulos | 65/102 |
| 4,090,776 | 5/1978 | Bernal et al. | 350/96.12 |
| 4,111,520 | 9/1978 | Bernal | 350/96.12 |
| 4,403,825 | 9/1983 | Tangonan et al. | 350/96.11 |
| 4,609,252 | 9/1986 | Wong et al. | 350/96.12 |
| 4,652,290 | 3/1987 | Cho et al. | 65/31 |
| 4,710,605 | 12/1987 | Presby | 219/121 LJ |
| 4,733,927 | 3/1988 | Jackson et al. | 350/96.12 |

FOREIGN PATENT DOCUMENTS

2180667A 4/1987 United Kingdom ............. 350/96.12

OTHER PUBLICATIONS

Oohara et al., *Optical Communication*, Nov. 1981, published by Corona-sha, p. 142.

*Primary Examiner*—Frank González
*Attorney, Agent, or Firm*—Antonelli, Terry & Wands

[57] ABSTRACT

Formed on a low refractive index layer (refractive index $n_b$) is a core waveguide (refractive index $n_c$, $n_c > n_b$) and formed on the core waveguide is a cladding whose refractive index $n_{cl}$ ($n_{cl} < n_c$, $n_{cl} \neq n_b$) is varied in the propagation direction of optical signals. Formed on a low refractive index layer (refractive index $n_b$) is a core waveguide whose refractive index $n_c$ ($n_c > n_b$) is continuously varied in the propagation direction of optical signals and formed on the entire core waveguide is a cladding (refractive index $n_{cl}$, $n_{cl} < n_c$).

17 Claims, 17 Drawing Sheets

MOVING DIRECTION OF $CO_2$ LASER BEAM 6

$CO_2$ LASER BEAM IRRADIATION LIGHT 5

LIGHT PROPAGATION DIRECTION

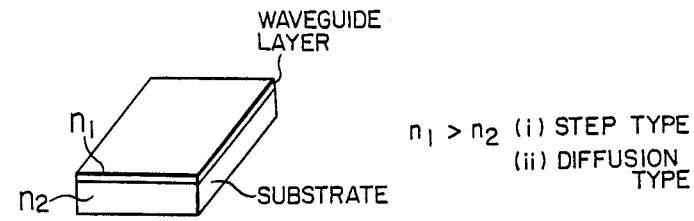
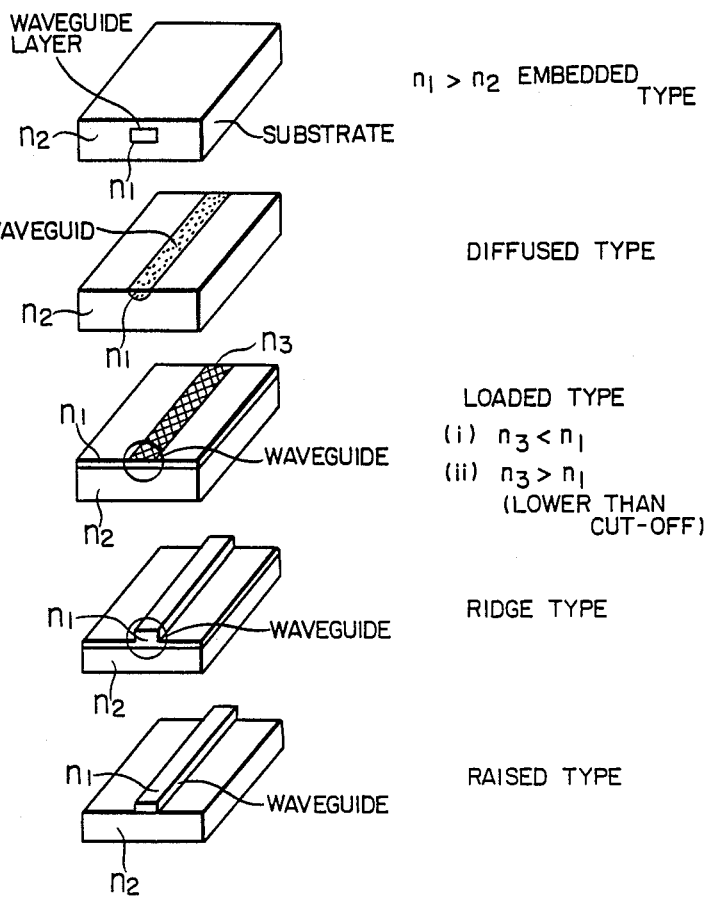
FIG. 17a PLANAR OPTICAL WAVEGUIDE (TWO-DIMENTIONAL WAVEGUIDE)
$n_1 > n_2$ (i) STEP TYPE
(ii) DIFFUSION TYPE
FIG. 17b CHANNEL TYPE OPTICAL WAVEGUIDE (THREE-DIMENTIONAL WAVEGUIDE)
$n_1 > n_2$ EMBEDDED TYPE
DIFFUSED TYPE
LOADED TYPE
(i) $n_3 < n_1$
(ii) $n_3 > n_1$ (LOWER THAN CUT-OFF)
RIDGE TYPE
RAISED TYPE

OPTICAL WAVEGUIDE AND METHOD FOR FABRICATING THE SAME

BACKGROUND OF THE INVENTION

This invention relates to an optical waveguide having a refractive index distribution in the propagation direction of light and a method for fabricating such waveguides.

With the development of techniques of optical fiber communication, optical devices have been required to have the capabilities of mass productivity, high reliability, non-adjustment of coupling, automatic assembling, low-loss, etc. To this end, in recent years, optical waveguide type optical devices have become more widely used.

Previously known optical waveguides constituting waveguide type optical devices are shown in FIGS. 17a and 17b, as disclosed in Oohara and Kimura, "OPTICAL COMMUNICATION", page 142, Nov. 1981 published by Corona-sha. These optical waveguides have a stepwise or continuous refractive index distribution in the thickness and width direction but have a fixed refractive index distribution in the propagation direction of optical signals.

Since all the optical waveguides as shown in FIGS. 17a and 17b have a fixed refractive index distribution or (property) in the direction of light or optical signal beam propagation, i.e. in the longitudinal direction of the optical waveguides, they have a disadvantage of the absence of the capability of converging or diffusing the optical signal beam with the propagation thereof. In order to overcome such a disadvantage, it has been proposed to provide a lens as part of the optical waveguide. However, such a lens is required to have a reduced aberration and a desired focal length and also it has been very difficult to attain good controllability in making it. Thus, the prior art waveguide type optical devices are inferior in their optical property (propagation loss, isolation between the channels, etc.) to the optical devices assembled by individual optical components.

SUMMARY OF THE INVENTION

An object of this invention is to provide the arrangement of an optical waveguide that can solve the problems as mentioned above and a method of fabricating such a waveguide, thus realizing the low propagation loss, high performance, and miniaturization of the optical device.

The above object may be attained, according to one aspect of this invention, by forming, on a low refractive index layer (refractive index $n_b$), a core waveguide (refractive index $n_c$, $n_c > n_b$) and also forming on the core waveguide a cladding having a varied refractive index $n_{cl}$ ($n_{cl} < n_c$, $n_{cl} \neq n_b$) in the propagation direction of optical signals. The refractive index $n_{cl}$ of the clad may have a substantially uniform slope of increase, or decrease both increase and decrease, etc. The core waveguide may include several kinds of a linear waveguide, curved waveguide, bendable waveguide, Y-shaped waveguide, etc. The cladding having such a varied refractive index as mentioned above can be formed by previously forming a film having a refractive index to be varied by the subsequent high temperature heat treatment, which is formed by means of the techniques of low-temperature chemical vapor deposition (low-temperature CVD), low-temperature evaporation, low-temperature sputtering, etc., and theafter irradiating the film with a $CO_2$ laser beam having the irradiation time or light amount varying along the propagation direction of optical signals.

The above object may also be attained, in accordance with another aspect of this invention, by forming on a low refractive index layer (refractive index $n_b$) a core waveguide having a continuously varying refractive index $n_c$ ($n_c > n_b$) in the propagation direction of optical signals and also forming on the entire waveguide a cladding having a refractive index of $n_{cl}$ ($n_{cl} < n_c$). The refractive index $n_c$ of the core waveguide, as in the case of the cladding mentioned above, may have the slope of a substantially uniform increase or decrease or both increase and decrease, etc. in the propagation direction of optical signals.

Either or both of the cladding and the core waveguide may be varied in their refractive index.

This invention may be implemented using a new phenomenon which has been first discovered by the inventors of this invention. A silicate glass film several $\mu$m thick was formed on a silicon substrate by passing the gas containing monosilane $SiH_4$ (diluted to 4% concentration gas by $N_2$ gas), $N_2$ and $O_2$ onto the silicon substrate. Also, a phosphosilicate glass was formed on the silicon substrate by using the mixed as of the above gas and phosphine $PH_3$ (diluted into 1% gas by $N_2$ gas) The above silicate glass film or phosphosilicate glass film was irradiated with the optical output (about 10 W) from a $CO_2$ laser light source, the beam spot size of which is stopped down into about 6 mm $\phi$ by a lens made of Ge. Then, it was found by the inventors that the refractive index of the film is varied in accordance with the irradiation time of the laser beam as shown in FIG. 1 (the wavelength of the laser beam used for measurement is 0.63 $\mu$m). Further, it was confirmed through the measurement of the film thickness that the above variation of the refractive index of the film is due to the fact that the density of the film is improved with the increase of the irradiation time thereby to decrease the film thickness. Thus, the refractive index of the film can be almost continuously varied by adjusting the irradiation time or irradiation amount of the laser beam to be irradiated.

FIGS. 2a and 2b show the basic arrangement of an optical waveguide made considering the results shown in FIG. 1, FIG. 2a is a top view of the optical waveguide and FIG. 2b is a side view thereof. Formed on a substrate 1 is a low refractive index layer 2 on which a core 3 is formed. A cladding 4 the refractive index of which is varied through high temperature heat treatment clads the core 3. In operation, a $CO_2$ laser beam irradiation light 5 is radiated on the upper surface of the cladding 4 and moved at a speed of V from the point 0 to the point Z as shown by an arrow 6 in the propagation direction of optical signals (The optical waveguide may be moved instead of moving the the $CO_2$ laser beam). Then, if the moving speed V of the laser beam is controlled by a microcomputer or the like so as to have a speed distribution of uniform increase, or decrease, or both of them, the cladding 4 will have a refractive index distribution corresponding to the speed distribution in the propagation direction of optical signals. Thus, if the cladding 4 has such a refractive index distribution, the field distribution of the optical signals being propagated through the core is correspondingly varied so that the core can have a lens functions such as convergence, divergence of optical signals, etc. Additionally, in FIG. 2, the refractive indexes of the respective layers are set to have the relations: $n_c > n_b$, $n_c > n_{cl}$ and $n_{cl} \neq n_b$. The details thereof will be explained later in connection with the embodiments of this invention.

BRIEF DESCRIPTION OF THE DRAWINGS

FIG. 17a and 17b are schematic perspective views showing the fabrication steps of the conventional optical waveguides.

In these figures, like reference designations represent like features.

DESCRIPTION OF THE PREFERRED EMBODIMENTS

Figure 1:
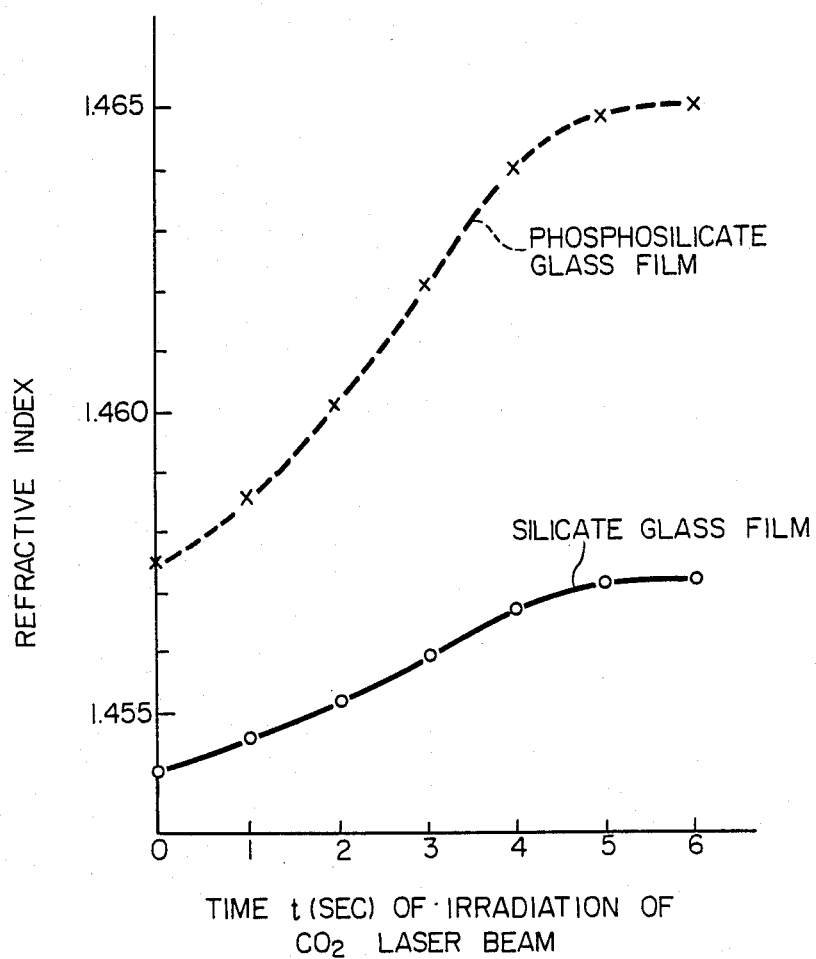
FIG. 1 is a graph showing the refractive index variation characteristic of a low-temperature CVD film due to the radiation of a $CO_2$ laser beam, which was found and confirmed by the inventors of this invention.
Figure 2B:
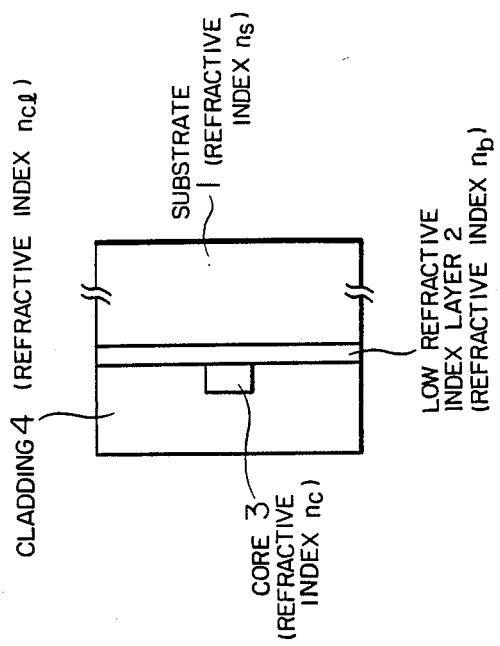
FIGS. 2a and 2b show the basic arrangements in constituting the optical waveguide according to this invention.
Figure 2A:
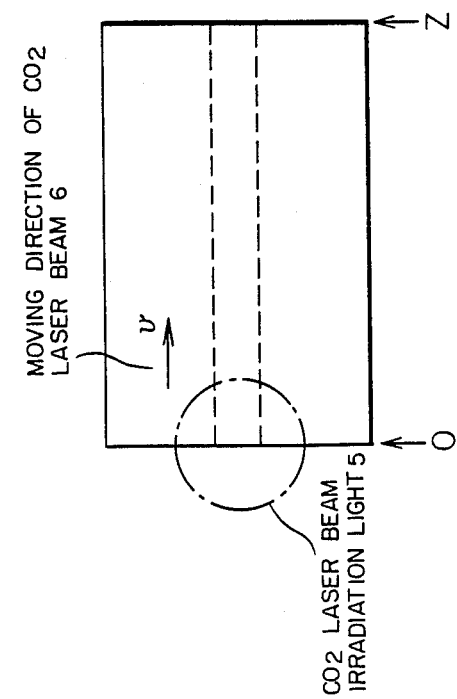
Figure 3B:
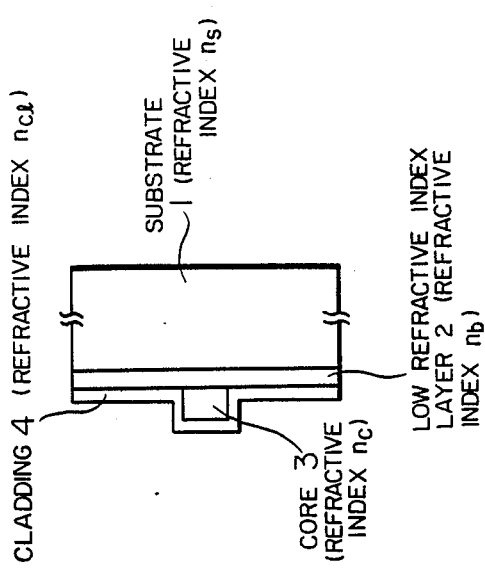
FIGS. 3a, 3b, FIGS. 4a, 4b, FIGS. 6a, 6b, FIGS. 8a, 8b and FIGS. 10a, 10b show embodiments of the optical waveguide according to this invention, respectively.
Figure 3A:
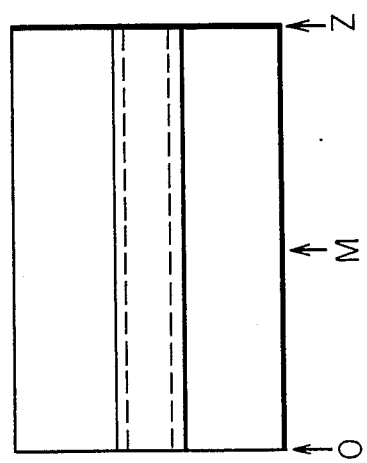
Figure 4B:
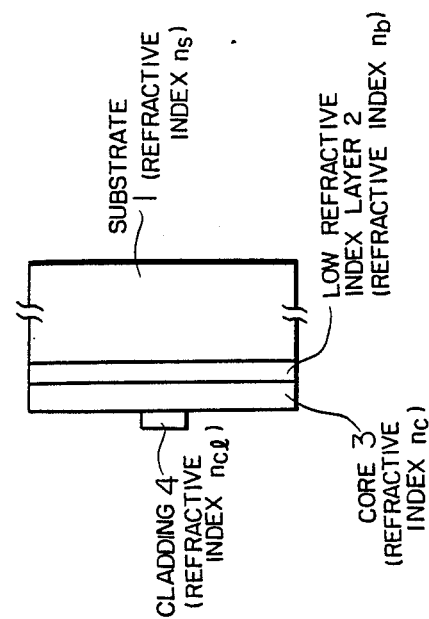
Figure 4A:
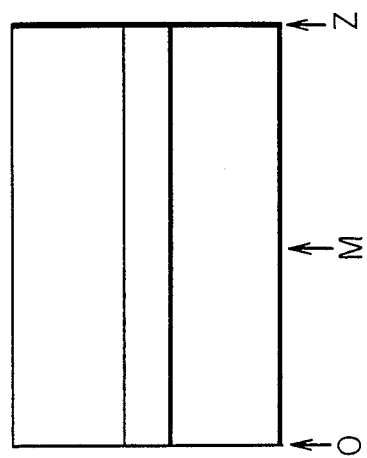
Figure 5A:
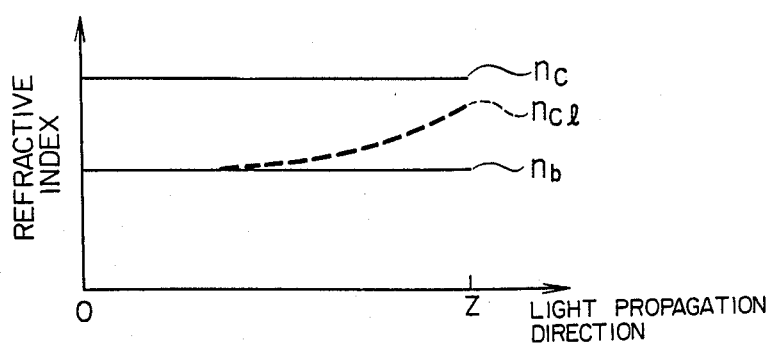
FIGS. 5a to 5c, FIGS. 7a, 7b and FIGS. 9a, 9b are graphs showing the refractive index distribution characteristics of the optical waveguide according to this invention.
Figure 5B:
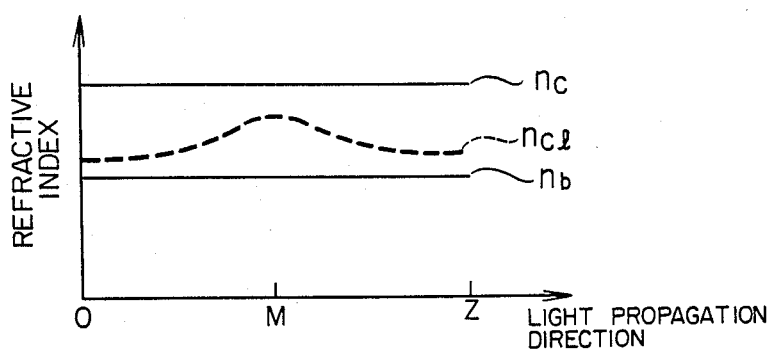
Figure 5C:
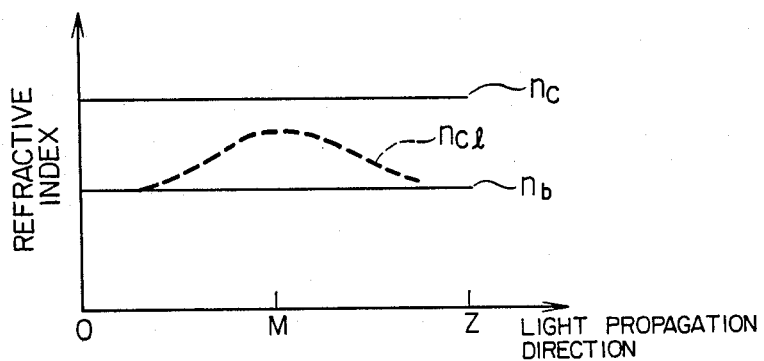

FIGS. 3a, 3b and FIGS. 4a, 4b show embodiments of the refractive index distribution type optical waveguide according to this invention; FIGS. 3a, 4a show top views thereof and FIGS. 3b, 4b show side views thereof. Both embodiments relate to a linear waveguide. First, formed on a substrate 1 ($SiO_2$ in the embodiments although Si, $SiO_2$, $LiNbO_3$, InP, GaAs, etc. may be used) are a low refractive index layer 2, which is made of a silicate glass film, and a core 3, which is made of a phosphosilicate glass, through the technique of low-temperature CVD (390° C.). Thereafter, the glass films 2 and 3 are subjected to heat treatment for about ten hours in a high temperature electric furnace (about 1000° C.) so as to provide uniform and dense glass films. In the case of the embodiment of FIGS. 3a, 3b, a patterning is subsequently made through the process of photolithography and reactive ion etching, etc. to a square waveguide. Thereafter, in both cases of FIGS. 3a, 3b and FIGS. 4a, 4b, another silicate glass film which constitutes a cladding 4 is formed on the core waveguide 3 through the technique of the above low-temperature CVD (390° C.). Then, as shown in FIGS. 2a, 2b, the $CO_2$ laser beam is radiated onto the cladding 4 with the irradiation time (or irradiation light amount) being varied so as to provide a refractive index distribution to the cladding 4. FIGS. 5a to 5c show an example of the refractive index distribution in this case. In these figures, the respective refractive indexes $n_c$, $n_{cl}$, and $n_b$ of the core 3, cladding 4 and low refractive index layer 2 are plotted. FIG. 5a illustrates the case where $n_{cl}$ increases in the propagation sense of optical signals. FIGS. 5b and 5c illustrate the case where $n_{cl}$ has a peak value in the neighborhood of the middle point M of the optical waveguide. The value relation between $n_{cl}$ and $n_b$ may be arbitrarily set and that between $n_c$ and $n_b$, $n_{cl}$ may also be arbitrarily set.

Figure 6B:
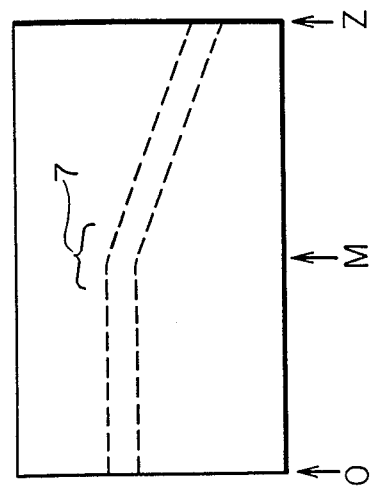
Figure 6A:
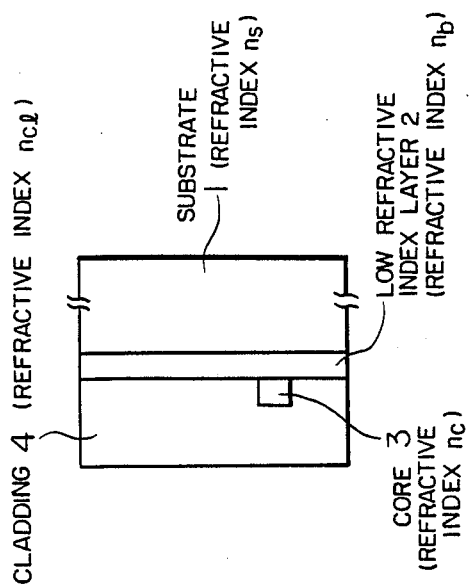
Figure 7A:
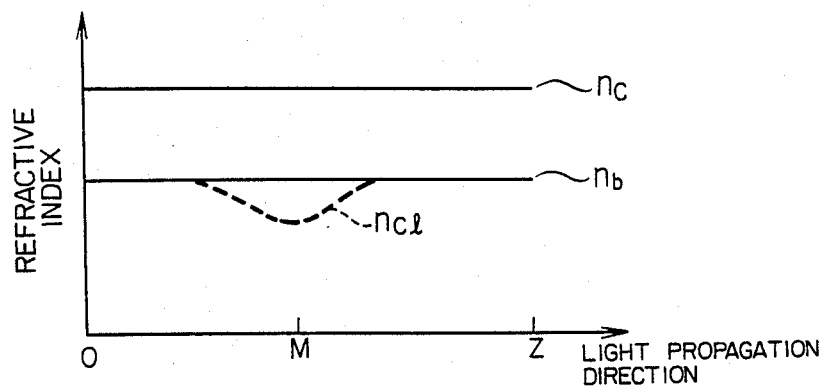
Figure 7B:
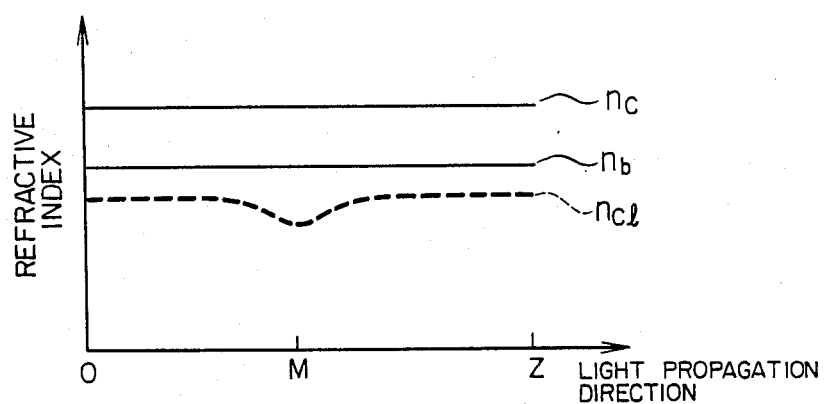

FIGS. 6a and 6b show another embodiment of this invention in which a refractive index distribution is given to a bending waveguide. FIGS. 7a and 7b illustrate the refractive index distribution characteristic of the waveguide of FIGS. 6a and 6b. If the refractive index of the cladding 4 is made low in the neighborhood of the bending portion 7 in FIG. 6a, the radiation loss at this portion can be decreased. This embodiment, in which a large bending angle can be obtained, is efficient to increase the integration degree of several kinds of optical devices.

Figure 8B:
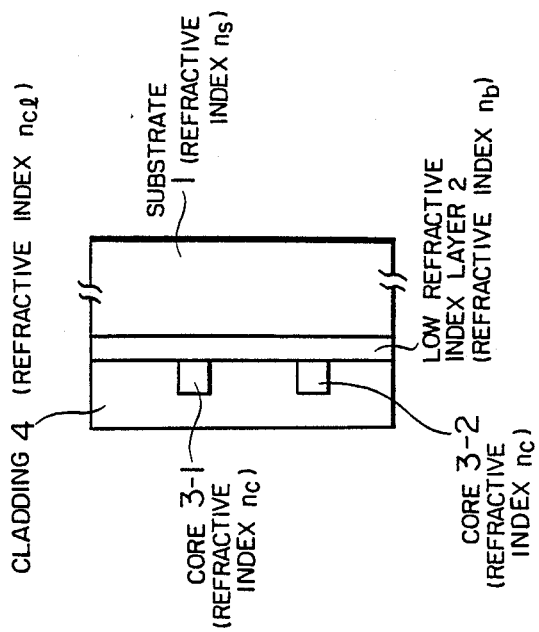
Figure 8A:
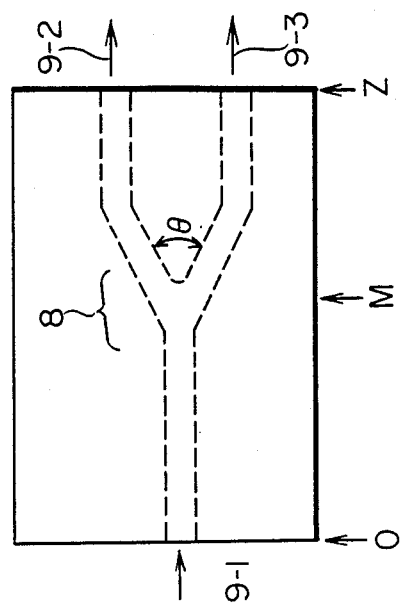
Figure 9A:
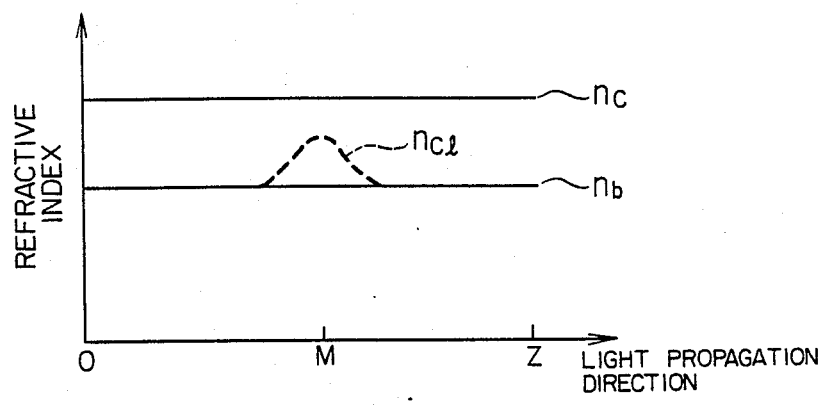
Figure 9B:
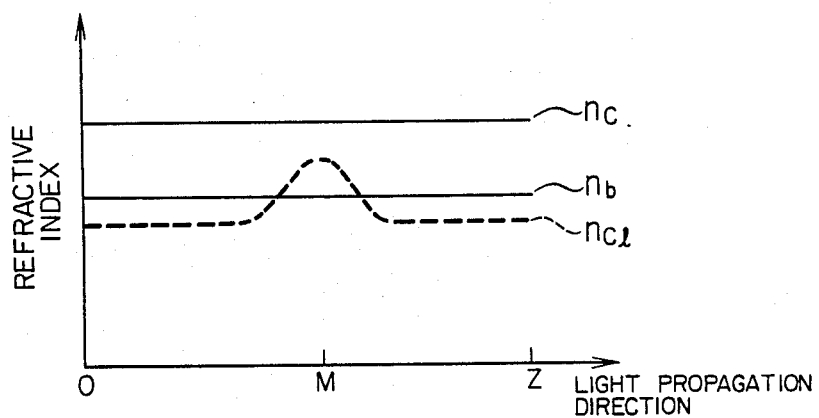

FIGS. 8a and 8b show still another embodiment of this invention which relates to a Y-shaped optical waveguide. FIG. 8a is a top plan view thereof and FIG. 8b is a side view thereof. As shown in FIG. 8a, an optical signal incident to the core as indicated by an arrow 9-1 is branched at a Y-shaped portion 8. One branch enters a core 3-1 as indicated by an arrow 9-2 and the other enters a core 3-2 as indicated by an arrow 9-3. FIGS. 9a and 9b illustrate examples of the refractive index distribution in the Y-shaped optical waveguide shown in FIGS. 8a and 8b. In both examples, the refractive index $n_{cl}$ of the cladding 4 is increased in the neighborhood of the Y-shaped portion 8. This permits the optical signal to be branched with reduced loss and a large branching angle $\theta$ to be taken. Accordingly, a opto/electronics semiconductor device such as a light emitting/receiving device is provided to have a reduced branch waveguide length, thus implementing the low loss of the optical device.

Figure 10B:
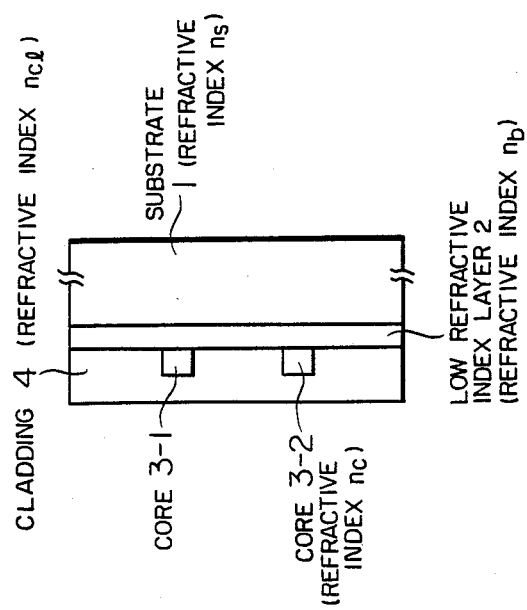
Figure 10A:
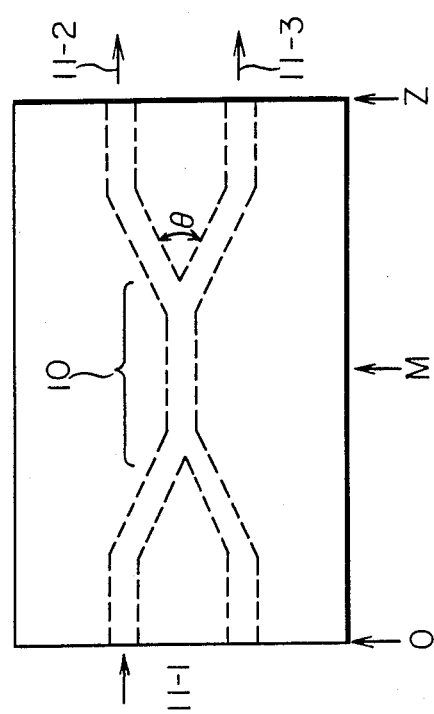

FIGS. 10a and 10b show a further embodiment of this invention relating to a branching connector. As shown in FIG. 10a an optical signal incident to the core waveguide as indicated by an arrow 11-1 is branched at a mixing portion 10 into two optical signals. The one branch thereof enters the core 3-1 as indicated by an arrow 11-2 and the other enters the core 3-2 as indicated by an arrow 11-3. In order that the optical signal may be equally distributed to the cores 3-1 and 3-2 with low loss, the refractive index of the cladding 4 is increased at the mixing portion 10 as in the cases of FIGS. 9a and 9b. Accordingly, the length of the mixing portion 10 may be shortened, thus implementing the low loss of the branching connector, and permitting a large branching angle $\theta$ to be taken as in the case of FIGS. 8a and 8b.

This invention is not limited to the embodiments as explained above. The respective materials of the low refractive index layer 2, core 3 and cladding 4 may also be a $SiO_2$ group glass (containing at least one dopant of B, P, Ti, Ge, etc.), glass containing alkali metal ions or alkaline-earth metal ions, etc. The optical waveguide may take the arrangement of a waveguide including a S-curve, circle-curve, etc., a directional coupler type waveguide, a taper shaped waveguide, a zigzag shaped waveguide, etc., or the combinations thereof. The cladding 4 is formed at a low temperature (which is lower than the temperature for heat treatment and is preferably in the range of 150° C. to 900° C.) and is heat-treated at the temperature (up to the melting temperature of the film) higher than it. If the cladding is heat-treated at too high a temperature, the shape of the cladding 4 will be deformed. Then, the cladding should be heat-treated at the temperature where the cladding is not deformed. Further, if the substrate 1 has a refractive index $n_s$ substantially equal to that of the low refractive index layer 2, the low refractive index layer 2 may be omitted.

Additionally, although optical devices such as a semiconductor light-emitting device, light-receiving device, optical modulation device, optical switch, etc. are not illustrated for simplicity of illustration of the drawings, at least one of them is, of course, provided in an actual device. An optical fiber not shown is also actually connected with the input terminal or output terminal of the optical waveguide.

In accordance with this invention, a cladding having a distribution of the refractive index continuously varying in the propagation direction of optical signals makes it possible to realize the low loss, high capability and miniaturization of the optical waveguide.

Figure 11A:
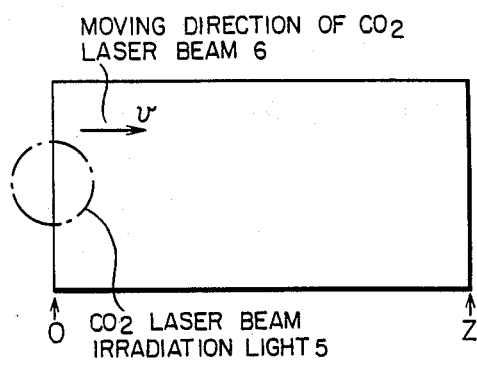
FIGS. 11a to 11f show plan views and sectional views for explaining a method for fabricating an optical waveguide according to this invention.
Figure 11B:
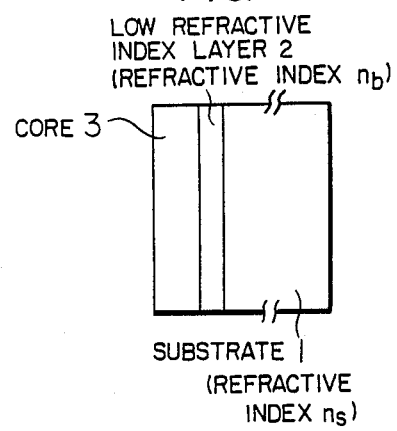
Figure 11C:
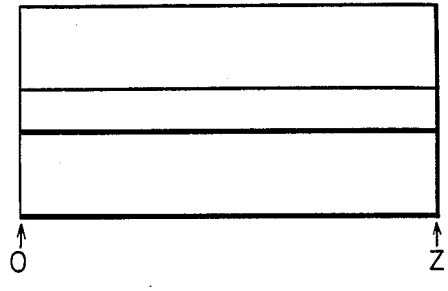
Figure 11D:
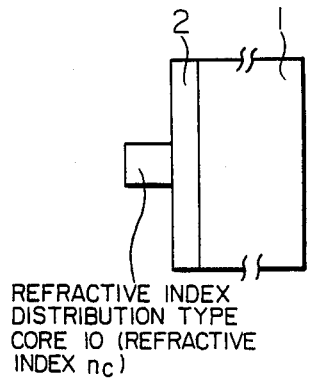
Figure 11E:
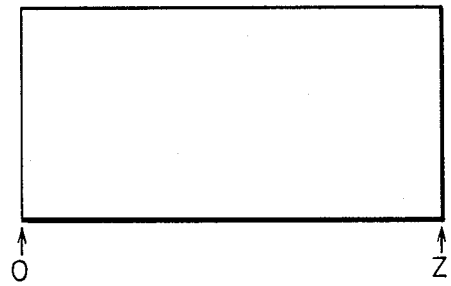
Figure 11F:
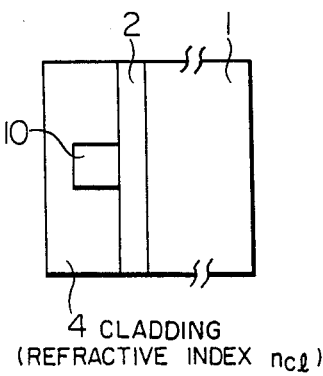
Figure 12A:
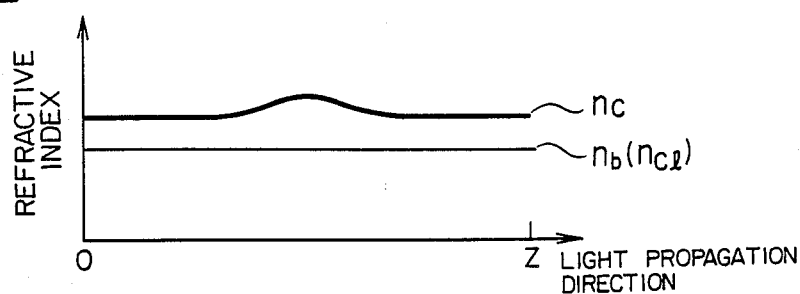
FIGS. 12a to 12d are graphs showing the refractive index distribution of the core in the optical waveguide according to this invention.
Figure 12B:
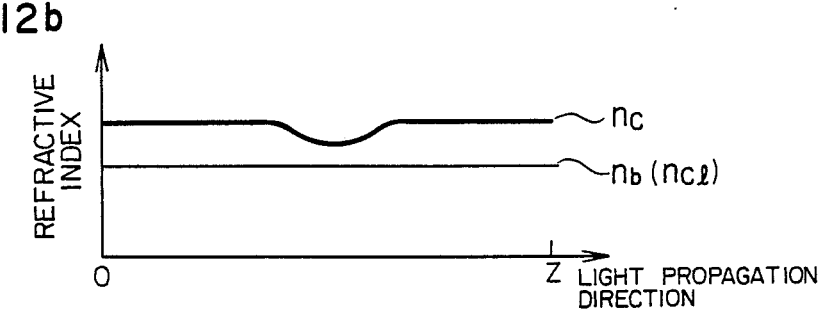
Figure 12C:
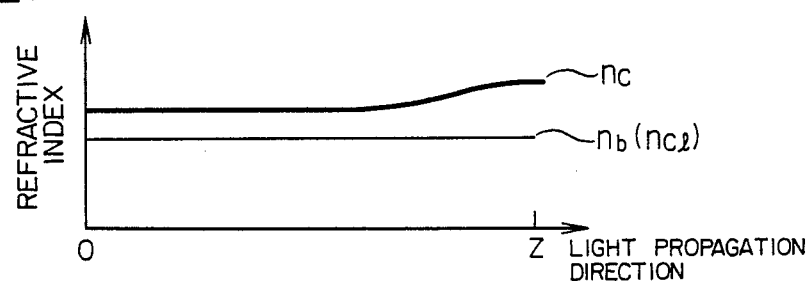
Figure 12D:
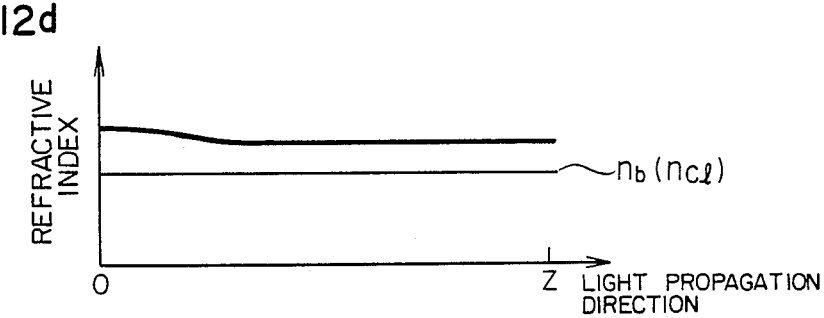

FIGS. 11a to 11f show a still further embodiment of this invention in which the refractive index of a core is varied. First, as shown in FIGS. 11a and 11b, formed on the substrate 1 (refractive index $n_s$) is the low refractive index layer 2 (refractive index $n_b$) made of e.g. a silicate glass film about 10 μm thick. Thereafter, at the temperature of 390° C., formed on the low refractive index layer 2 is the core layer 3 (refractive index $n_{c'}$, $n_{c'} > n_b$) made of a phosphosilicate glass film about 8 μm thick. A $CO_2$ laser beam projected onto the core layer 3 is moved thereon in the sense of the arrow 6. Then, the refractive index distribution $n_c(Z)$ of the core 3 irradiated with the $CO_2$ laser beam is varied as illustrated in FIGS. 12a to 12d in accordance with the moving speed of the laser beam and the irradiation amount of light. An optical waveguide is patterned in the core layer 3 through the process of photolithography, dry etching, etc. so as to provide a core 10 having the refractive index $n_c$ (Z). Thereafter, as shown in FIGS. 11e and 11b, the cladding 4 (refractive index $n_{cl}$, $n_{cl} < n_c$) is formed on the entire waveguide including the core 10. Then, this cladding 4 is formed at the temperature lower than the temperature of the core layer 3 increased by the radiation of the $CO_2$ laser beam shown in FIG. 11a. This intends to prevent the refractive index distribution of the core 10 from being varied in forming the cladding 4.

Figure 13B:
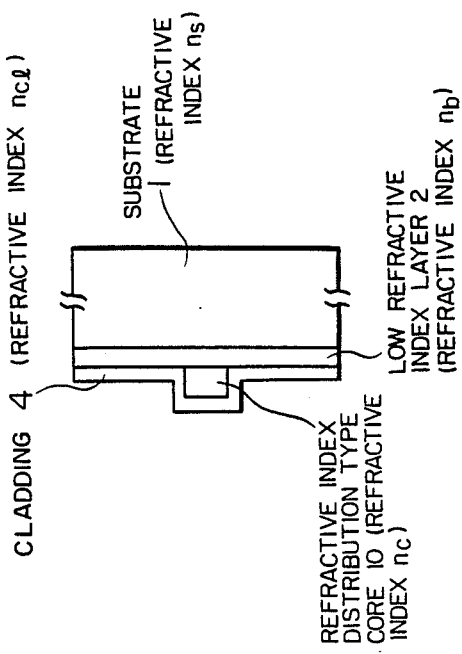
FIGS. 13a and 13b are a plan view and a sectional view showing another embodiment of the optical waveguide according to this invention.
Figure 13A:
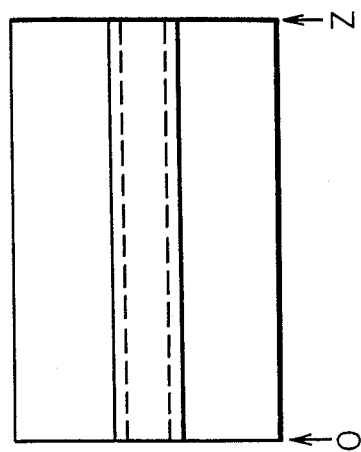

FIGS. 13a and 13b show a still further embodiment of the optical waveguide according to this invention in which the thickness of the cladding 4 is relatively low.

Several embodiments of the optical device using the optical waveguide according to this invention will be explained.

Figure 14B:
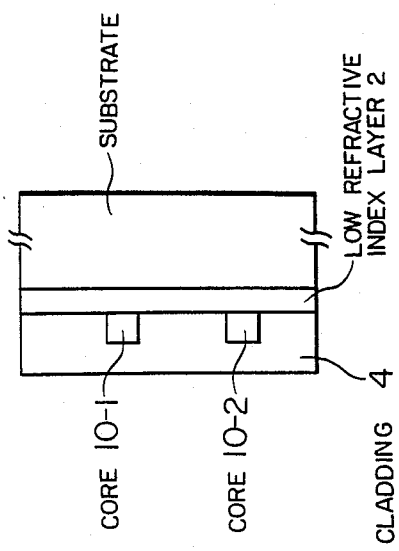
FIGS. 14a to 14c and FIGS. 15a to 15c are a plan view and a sectional view of the optical devices using the optical waveguide according to this invention, and a graph showing the refractive index distribution therein, respectively.
Figure 14A:
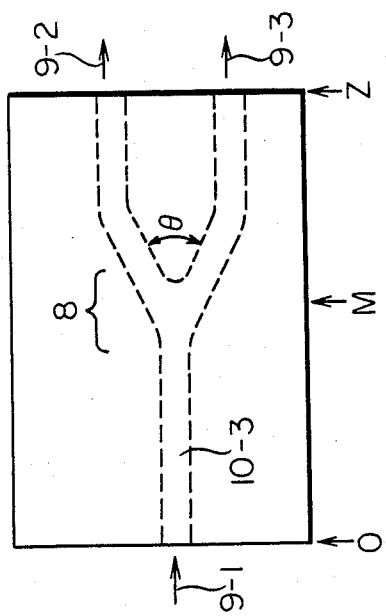
Figure 14C:
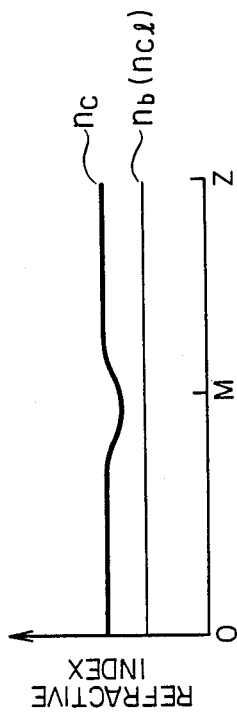

FIGS. 14a to 14c show an embodiment of the Y-branch waveguide according to this invention. FIG. 14a is a top plan view thereof and FIG. 14b is a side view thereof. FIG. 14c shows the refractive index distribution in the propagation direction of optical signals. As seen from FIG. 14c, the refractive index of the core 2 is made continuously low in the neighborhood of the Y-branch portion 8. Then, the optical signal having been propagated through a core 10-3 from the direction of an arrow 9-1 has an expanded light intensity distribution in the neighborhood of the Y-branch portion 8 and is branched with low loss into branching core waveguides 10-1 and 10-2. The prior art device provides a large emission loss and refraction loss in the branching portion, thus leading to increased loss. Also, the prior art device can not take a large branching angle $\theta$ so that when semiconductor optical devices, optical fibers, etc. are required to be connected on the side of the branching waveguides, the optical waveguides must be greatly lengthened. On the other hand, this invention can take a relatively large branching angle $\theta$, the branching optical waveguides can be shortened, thus implementing the low loss of the waveguide.

Figure 15B:
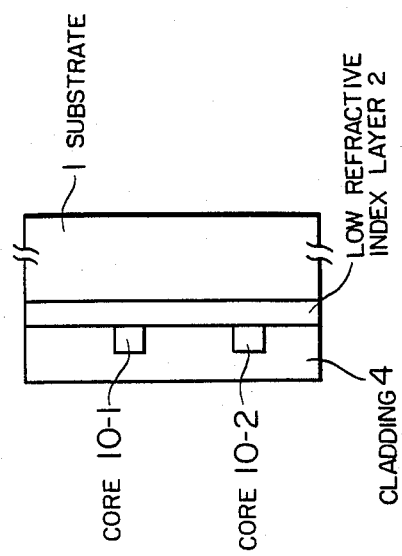
Figure 15A:
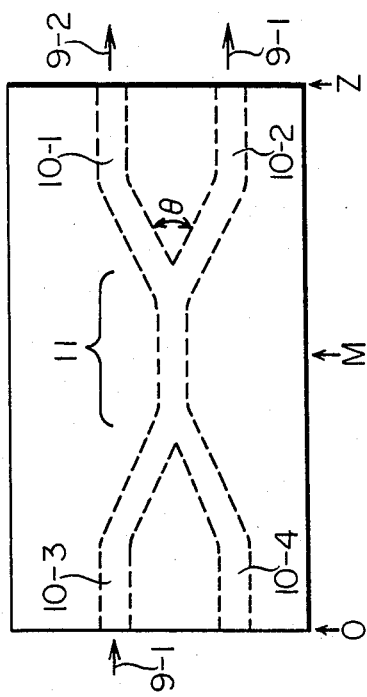
Figure 15C:
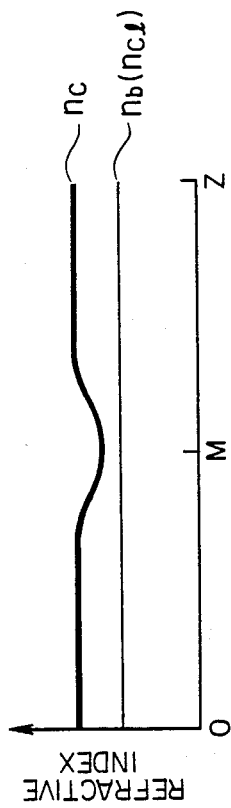

FIGS. 15a to 15c show an embodiment of the branching connector according to this invention. The branching connector is an optical device of equally branching the optical signal incident to the waveguide 10-3 into the branching waveguides 10-1 and 10-2. Conventionally, such an optical device results in a very long mixing portion 11, thus leading to an increased loss. In order to shorten the mixing portion 11, it has been proposed to provide a tapered portion there. However, this results in an increased radiation loss, and so an increased loss. Further, taking a large branching angle $\theta$ makes it difficult to equally branch or distribute the optical signal so that a small branching angle $\theta$ was taken. This small branching angle $\theta$, however, results in a narrow interval between the branching waveguides 10-1 and 10-2, thus making it difficult to connect semiconductor optical devices with the end faces of the branching waveguides. On the other hand, if the refractive index of the core is made continuously low at the mixing portion 11 as in this invention, the light can be easily mixed there. This permits the mixing portion 11 to be shortened and the branching angle $\theta$ to be made large, thus making easy the provision of semiconductor optical devices.

Incidentally, the cladding 4 may be made of, instead of glass, plastic, a combination of glass and plastic, or the like.

Figure 16:
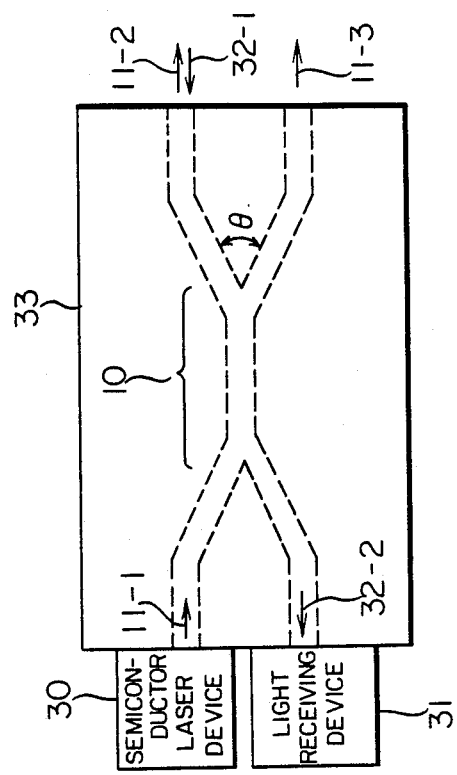
FIG. 16 shows a module in which the optical waveguide according to this invention and an active device are united.

In accordance with this invention, a core having a distribution of the refractive index continuously varying in the propagation direction of optical signals makes it possible to realize the low loss, high capability and miniaturization of the optical waveguide FIG. 16 shows a module in which active devices such as a semiconductor laser and a light receiving device is integrally incorporated in the optical waveguide according to this invention. In this figure, a laser beam 11-1 emitted from a semiconductor laser 30 is branched into two optical signals 11-2 and 11-3 at a mixing portion 10 of the optical waveguide 33, which are propagated through optical fibers, etc. On the other hand, a light receiving device 31 receives an optical signal 32-2. This optical signal 32-2 is provided by passing an optical signal 32-1 from the optical fiber through the mixing portion 10. Thus, this embodiment, in which the active devices are integrally connected with the optical waveguide so as to form a module, can provide a compact and stabilized device for bidirectional communication.

I claim:

1. An optical waveguide comprising a low refractive index layer having a refractive index of $n_b$, a core waveguide formed on said low refractive index layer and having a refractive index of $n_c$ (where $n_c > n_b$) and a cladding formed on said core waveguide and having a refractive index $n_{cl}$ (where $n_{cl} < n_c$, $n_{cl} \neq n_b$) varying in the propagation direction of optical signals.

2. An optical waveguide according to claim 1, wherein said core waveguide includes at least one of a linear waveguide, a curve waveguide, a bending waveguide, a Y-shaped waveguide, and a directional coupler type waveguide.

3. An optical waveguide according to claim 1, wherein said cladding is made of a material having a refractive index which is varied when heat-treated at a temperature higher than when the cladding is formed.

4. A method for fabricating an optical waveguide comprising the steps of:
forming, on a low refractive index layer having a refractive index of $n_b$, a core waveguide having a refractive index of $n_c$ (where $n_c > n_b$);
forming, on said core waveguide, a cladding having a refractive index $n_{cl}$ (where $n_{cl} < n_c$, $n_{cl} \neq n_b$) varying in the propagation direction of optical signals; and
applying heat energy onto the cladding along the propagation direction of optical signals in the optical wave so as to vary the refractive index of said cladding in the propagation direction of optical signals.

5. A method for fabricating an optical waveguide according to claim 4, wherein the amount of heat energy to be continuously applied along the propagation direction of optical signals in the optical waveguide is varied.

6. A method for fabricating an optical waveguide according to claim 4, wherein said heat energy is a $CO_2$ laser beam light.

7. An optical waveguide comprising a low refractive index layer having a refractive index of $n_b$, a core waveguide formed on said low refractive index layer and having a refractive index of $n_c$ (where $n_c > n_b$) continuously varying in the propagation direction of optical signals, and a cladding formed on the entire surface of said waveguide and having a refractive index of $n_{cl}$ (where $n_{cl} < n_c$).

8. An optical waveguide according to claim 7, wherein said core waveguide is made of a material having a refractive index which is varied when heat-treated a temperature higher than when the core waveguide is formed.

9. A method for fabricating an optical waveguide, comprising the steps of:
forming a core waveguide on a low refractive index layer;
applying heat energy onto the core waveguide along the propagation direction of optical signals so as to continuously vary the refractive index of said core waveguide in the propagation direction of optical signals;
patterning said core waveguide in accordance with a predetermined shape; and
forming a cladding on the patterned core waveguide.

10. A method for fabricating an optical waveguide according to claim 9, wherein the amount of heat energy to be continuously applied along the propagation direction of optical signals in the core waveguide is varied.

11. A method for fabricating an optical waveguide according to claim 9, wherein said heat energy is a $CO_2$ laser beam light.

12. An optical waveguide comprising a low refractive index layer having a refractive index of $n_b$, a core waveguide formed on said low refractive index layer and having a refractive index of $n_c$ (where $n_c > n_b$) and a cladding formed on said core waveguide and having a refractive index $n_{cl}$ (where $n_{cl} < n_c$, $n_{cl} \neq n_b$), the refractive index of at least one of said core waveguide and said cladding being continuously varied in the propagation direction of optical signals.

13. An optical waveguide according to claim 12, wherein an active device is connected with at least one end of said core waveguide so as to form a module as a whole.

14. An optical waveguide comprising a low refractive index layer having a refractive index of $n_b$, a core waveguide formed on said low refractive index layer and having a refractive index of $n_c$ (where $n_c > n_b$) means for converging an optical beam in the direction of propagation thereof and causing the core waveguide refractive index to continuously vary in a substantially uniform manner the propagation direction of optical signals, and a cladding material formed on the entire surface of said waveguide and having a refractive index of $n_{cl}$ (where $n_{cl} < n_c$).

15. An optical waveguide comprising a low refractive index layer having a refractive index of $n_b$, a core waveguide formed on said low refractive index layer and having a refractive index of $n_c$ (where $n_c > n_b$) means for diffusing an optical beam in the direction of propagation thereof and causing the core waveguide refractive index to continuously vary in a substantially uniform manner the propagation direction of optical signals, and a cladding material formed on the entire surface of said waveguide and having a refractive index of $n_{cl}$ (where $n_{cl} < n_c$).

16. A method for fabricating an optical waveguide, comprising the steps of:
forming a core waveguide on a low refractive index layer;
applying heat energy onto the core waveguide along the propagation direction of optical signals so as to continuously vary the refractive index of said core waveguide in the propagation direction of optical signals, the refractive index varying in a substantially uniform manner thereby to converge the optical beam;
patterning said core waveguide in accordance with a predetermined shape; and
forming a cladding material on the patterned core waveguide.

17. A method for fabricating an optical waveguide, comprising the steps of:
forming a core waveguide on a low refractive index layer;
applying heat energy onto the core waveguide along the propagation direction of optical signals so as to continuously vary the refractive index of said core waveguide in the propagation direction of optical signals, the refractive index varying in a substantially uniform manner thereby to diffuse the optical beam;
patterning said core waveguide in accordance with a predetermined shape; and
forming a cladding material on the patterned core waveguide.

* * * * *